under 35

(12) United States Patent
Ikeda et al.

(10) Patent No.: US 11,526,046 B2
(45) Date of Patent: Dec. 13, 2022

(54) DISPLAY DEVICE

(71) Applicant: Japan Display Inc., Tokyo (JP)

(72) Inventors: Kojiro Ikeda, Tokyo (JP); Tenfu Nakamura, Tokyo (JP); Kentaro Okuyama, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/219,106

(22) Filed: Mar. 31, 2021

(65) Prior Publication Data

US 2021/0311364 A1    Oct. 7, 2021

(30) Foreign Application Priority Data

Apr. 1, 2020 (JP) .............................. JP2020-066056

(51) Int. Cl.
*G02F 1/1334* (2006.01)
*G02F 1/1335* (2006.01)

(52) U.S. Cl.
CPC ........ *G02F 1/1334* (2013.01); *G02F 1/13345* (2021.01); *G02F 1/13347* (2021.01); *G02F 1/133616* (2021.01)

(58) Field of Classification Search
CPC ............... G02F 1/13345; G02F 1/1334; G02F 1/13347; G02F 1/133616; G02F 1/133615
See application file for complete search history.

(56) References Cited

U.S. PATENT DOCUMENTS

2015/0055055 A1* 2/2015 Ebisui ................... G02F 1/1334
349/61
2019/0302496 A1 10/2019 Okuyama

FOREIGN PATENT DOCUMENTS

JP        2019-174531 A    10/2019

* cited by examiner

*Primary Examiner* — Jia X Pan
(74) *Attorney, Agent, or Firm* — K&L Gates LLP

(57) ABSTRACT

According to one embodiment, a display device includes a first transparent substrate, a second transparent substrate having a first side surface and a second side surface, and a liquid crystal layer including a stripe-shaped polymer and liquid crystal molecules. The liquid crystal layer has a first region and a second region. When no voltage is applied to the liquid crystal layer, a first intersection angle of a first director of a first liquid crystal molecule and a first extension axis of the polymer included in the first region is different from a second intersection angle of a second director of a second liquid crystal molecule and a second extension axis of the polymer included in the second region.

13 Claims, 11 Drawing Sheets

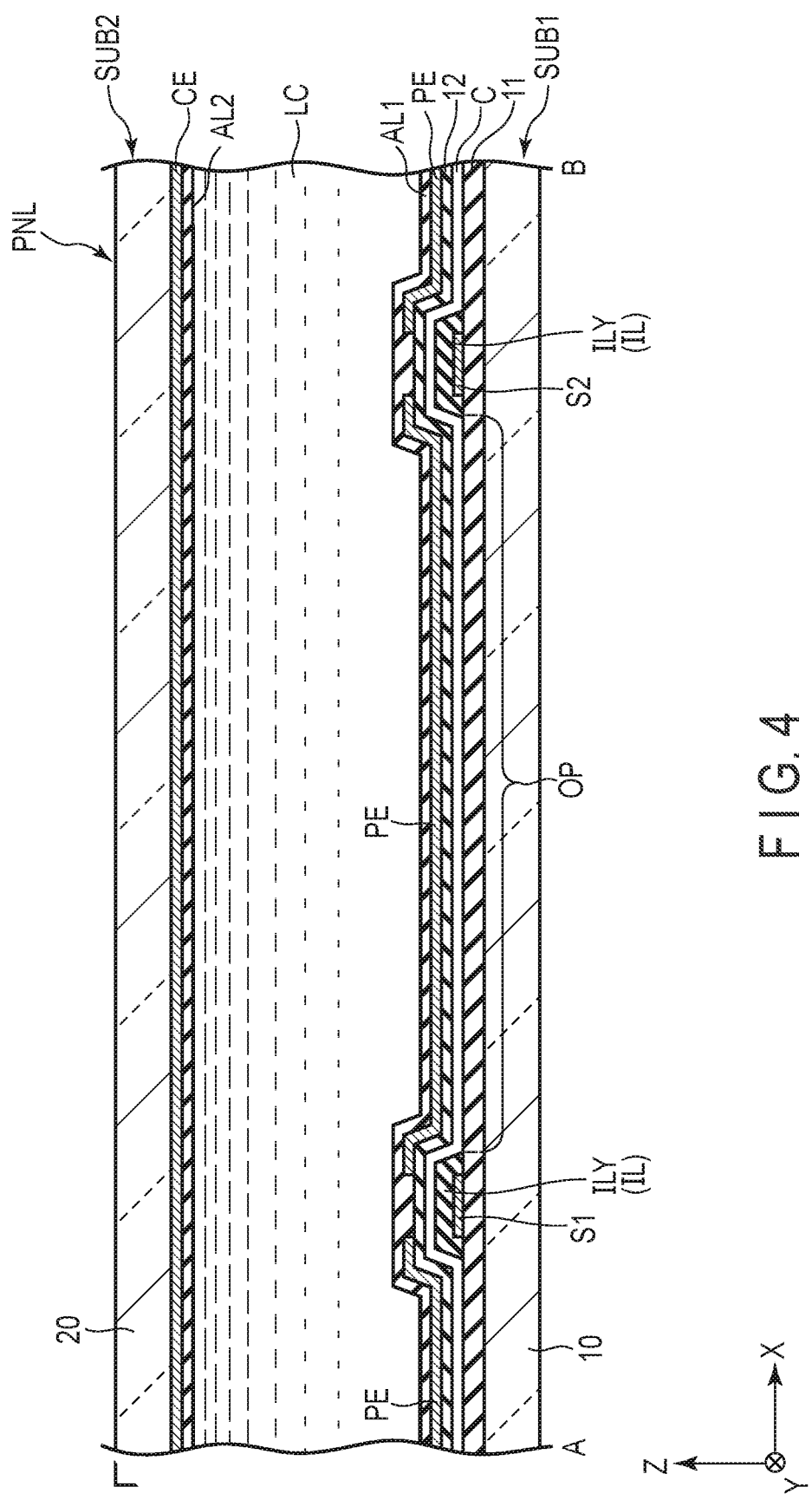
F I G. 4

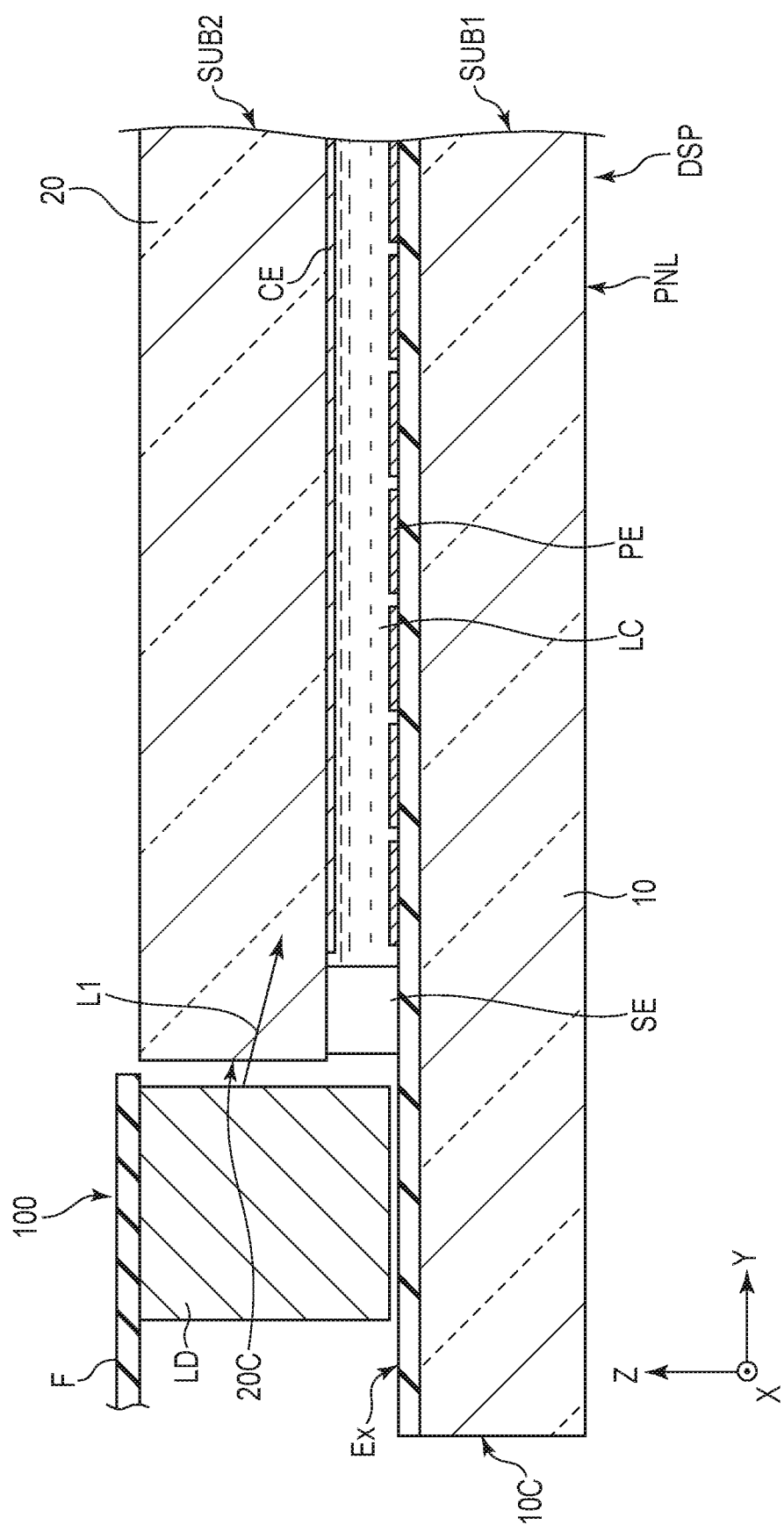
F I G. 6

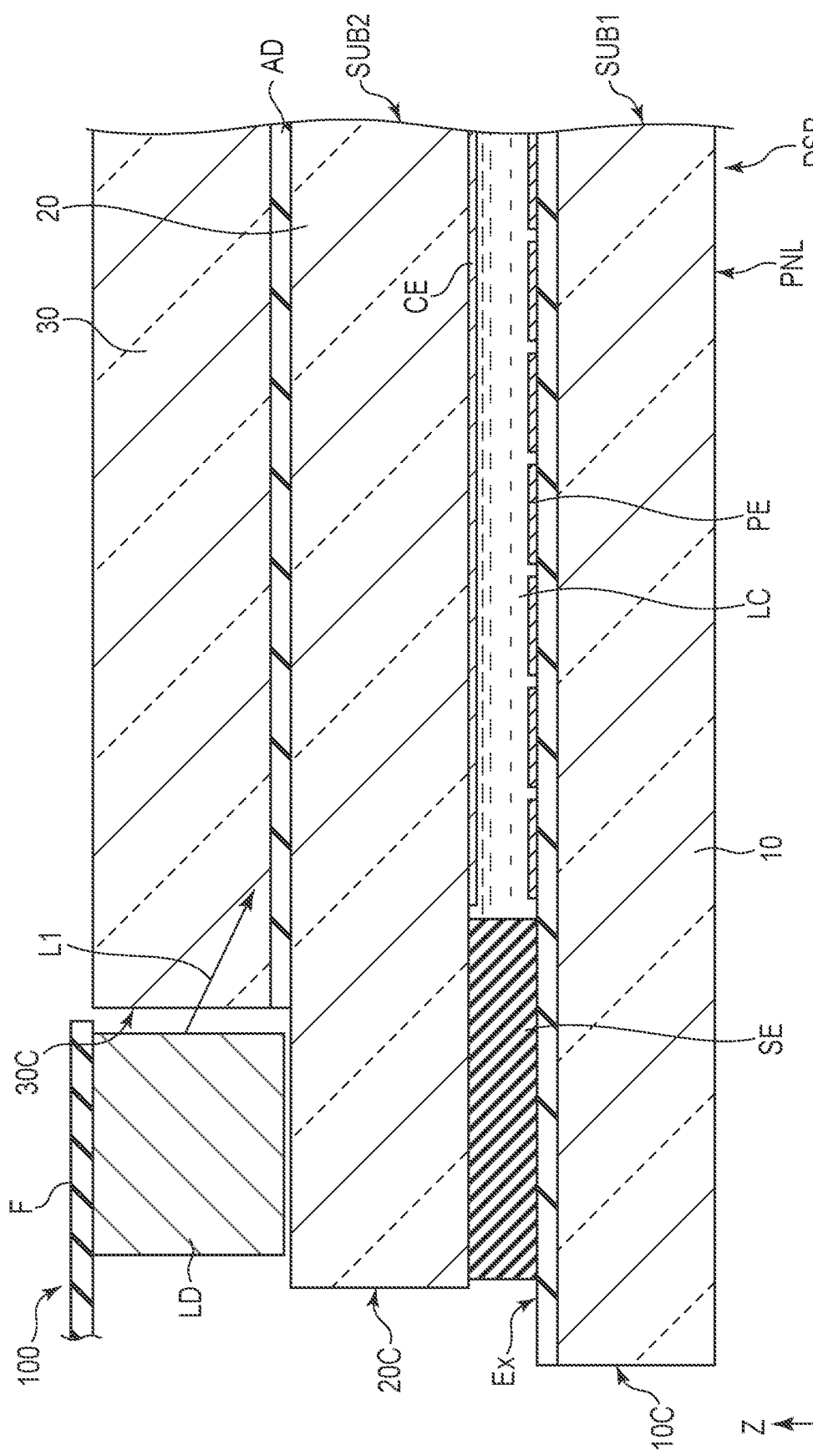
F I G. 7

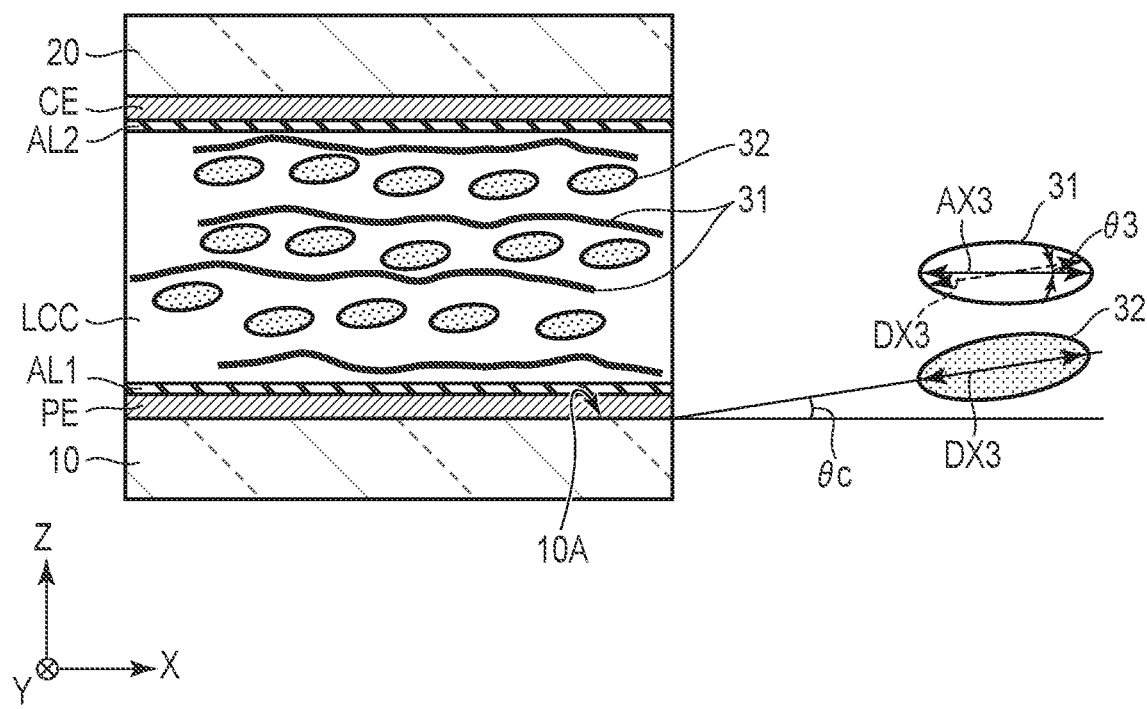
F I G. 10C

DISPLAY DEVICE

CROSS-REFERENCE TO RELATED APPLICATIONS

This application is based upon and claims the benefit of priority from Japanese Patent Application No. 2020-066056, filed Apr. 1, 2020, the entire contents of which are incorporated herein by reference.

FIELD

Embodiments described herein relate generally to a display device.

BACKGROUND

Recently, a display device using a polymer dispersed liquid crystal capable of switching a scattering state of scattering incident light and a transparent state of transmitting incident light has been proposed. In one example, a display device comprising a polarizer between a first display panel and a second display panel is disclosed. In the display device, a liquid crystal layer of the first display panel includes a stripe-shaped polymer and liquid crystal molecules, and the extension direction of the polymer is orthogonal to the transmission axis of the polarizer.

SUMMARY

The present disclosure relates generally to a display device.

According to an embodiment, a display device includes a first transparent substrate, a second transparent substrate having a first side surface and a second side surface, and a liquid crystal layer including a stripe-shaped polymer and liquid crystal molecules. The liquid crystal layer has a first region and a second region. When no voltage is applied to the liquid crystal layer, a first intersection angle of a first director of a first liquid crystal molecule and a first extension axis of the polymer included in the first region is different from a second intersection angle of a second director of a second liquid crystal molecule and a second extension axis of the polymer included in the second region.

BRIEF DESCRIPTION OF THE DRAWINGS

FIG. 4 is a cross-sectional view showing an example of a display panel PNL along line A-B shown in FIG. 3.

FIG. 6 is a cross-sectional view showing another configuration example of the display device DSP of the present embodiment.

FIG. 7 is a cross-sectional view showing another configuration example of the display device DSP of the present embodiment.

FIG. 10C is a cross-sectional view showing the polymer 31 and the liquid crystal molecules 32 in the third region LCC shown in FIG. 1.

DETAILED DESCRIPTION

Figure 1:
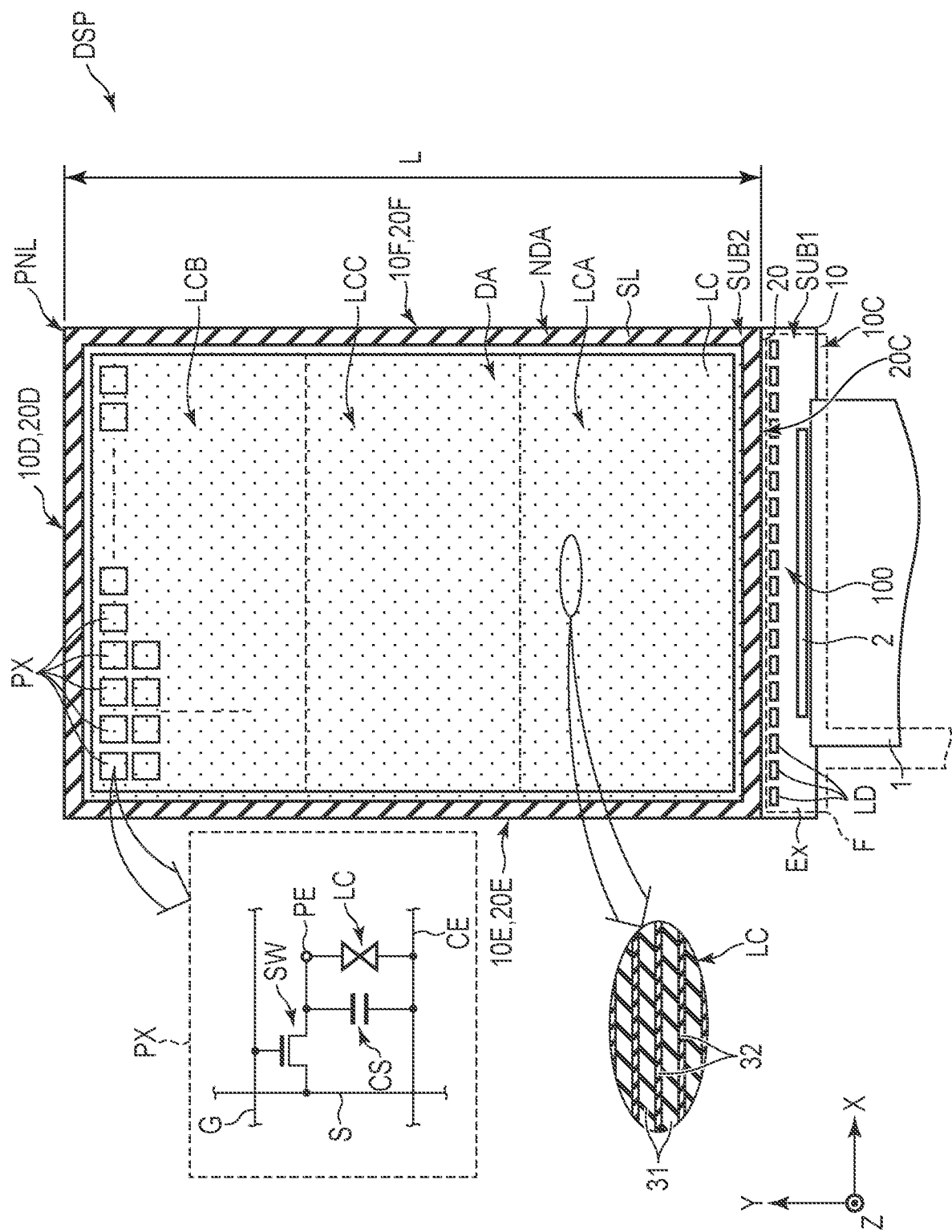
FIG. 1 is a plan view showing a configuration example of a display device DSP of the present embodiment.

In general, according to one embodiment, there is provided a display device comprising a first substrate, a second substrate and a liquid crystal layer. The first substrate comprises a first transparent substrate, and a pixel electrode disposed in each of a plurality of pixels on the first transparent substrate. The second substrate comprises a second transparent substrate having a first side surface and a second side surface opposite to the first side surface, and a common electrode disposed over the pixels. The liquid crystal layer is disposed between the first substrate and the second substrate, and includes a stripe-shaped polymer and liquid crystal molecules. The liquid crystal layer has a first region which is closer to the first side surface than to the second side surface, and a second region which is closer to the second side surface than to the first side surface and is located between the second side surface and the first region. When no voltage is applied to the liquid crystal layer, a first intersection angle of a first director of a first liquid crystal molecule and a first extension axis of the polymer included in the first region is different from a second intersection angle of a second director of a second liquid crystal molecule and a second extension axis of the polymer included in the second region.

According to another embodiment, there is provided a display device comprising a first substrate, a second substrate and a liquid crystal layer. The first substrate comprises a first transparent substrate, a pixel electrode disposed in each of a plurality of pixels on the first transparent substrate, and a first alignment film covering the pixel electrode. The second substrate comprises a second transparent substrate having a first side surface and a second side surface opposite to the first side surface, a common electrode disposed over the pixels, and a second alignment film covering the common electrode. The liquid crystal layer is disposed between the first substrate and the second substrate, and includes a stripe-shaped polymer and liquid crystal molecules. The liquid crystal layer has a first region which is closer to the first side surface than to the second side surface, and a second region which is closer to the second side surface than to the first side surface and is located between the second side surface and the first region. When no voltage is applied to the liquid crystal layer, a first inclination angle of a first extension axis of a first polymer included in the first region with respect to the first transparent substrate is different from a second inclination angle of a second extension axis of a second polymer included in the second region with respect to the first transparent substrate.

According to yet another embodiment, there is provided a display device comprising a first substrate, a second substrate and a liquid crystal layer. The first substrate comprises a first transparent substrate, a pixel electrode disposed in each of a plurality of pixels on the first transparent substrate, and a first alignment film covering the pixel electrode. The second substrate comprises a second transparent substrate having a first side surface and a second side surface opposite to the first side surface, a common electrode disposed over the pixels, and a second alignment film covering the common electrode. The liquid crystal layer is disposed between the first substrate and the second substrate, and includes a stripe-shaped polymer and liquid crystal molecules. The liquid crystal layer has a first region which is closer to the first side surface than to the second side surface, and a second region which is closer to the second side surface than to the first side surface and is located between the second side surface and the first region. When no voltage is applied to the liquid crystal layer, a first inclination angle of a first director of a first liquid crystal molecule included in the first region with respect to the first transparent substrate is different from a second inclination angle of a second director of a second liquid crystal molecule included in the second region with respect to the first transparent substrate.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, constituent elements which function in the same or a similar manner to those described in connection with preceding drawings are denoted by the same reference sings, and detailed descriptions of them that are considered redundant are omitted unless otherwise necessary.

FIG. 1 is a plan view showing a configuration example of a display device DSP of the present embodiment. In one example, a first direction X, a second direction Y and a third direction Z are orthogonal to one another. However, they may cross one another at an angle other than 90°. The first direction X and the second direction Y correspond to directions parallel to the main surface of a substrate constituting the display device DSP, and the third direction Z corresponds to the thickness direction of the display device DSP. In the present embodiment, viewing an XY-plane defined by the first direction X and the second direction Y is referred to as planar view.

In the present embodiment, a liquid crystal display device employing a polymer dispersed liquid crystal is described as an example of the display device DSP. The display device DSP comprises a display panel PNL comprising a polymer dispersed liquid crystal layer (hereinafter referred to simply as a liquid crystal layer LC), a wiring board 1, an IC chip 2 and a light-emitting module 100.

The display panel PNL comprises a first substrate SUB1, a second substrate SUB2, a liquid crystal layer LC and a sealant SE. The first substrate SUB1 and the second substrate SUB2 are formed in a flat plate shape along the XY-plane. The first substrate SUB1 and the second substrate SUB2 overlap each other in planar view. The first substrate SUB1 and the second substrate SUB2 are bonded together by the sealant SE. The liquid crystal layer LC is held between the first substrate SUB1 and the second substrate SUB2, and is sealed in by the sealant SE.

As enlarged and schematically shown in FIG. 1, the liquid crystal layer LC includes a polymer 31 and liquid crystal molecules 32. In one example, the polymer 31 is a liquid crystal polymer. The polymer 31 is formed in a stripe shape extending along the first direction X, is arranged in the second direction Y, and is also arranged in the third direction Z as will be described later. The liquid crystal molecules 32 are disposed in gaps in the polymer 31, and are aligned such that major axes of them extend along the first direction X. The polymer 31 and the liquid crystal molecule 32 each have optical anisotropy or refractive anisotropy. The responsiveness to an electric field of the polymer 31 is less than the responsiveness to an electric field of the liquid crystal molecule 32.

In one example, the alignment direction of the polymer 31 hardly changes regardless of the presence or absence of an electric field. On the other hand, the alignment direction of the liquid crystal molecule 32 changes according to an electric field in a state where a high voltage of greater than or equal to a threshold value is applied to the liquid crystal layer LC. In a state (initial alignment state) where no voltage is applied to the liquid crystal layer LC, the optical axis of the polymer 31 and the optical axis of the liquid crystal molecule 32 are substantially parallel to each other, and light entering the liquid crystal layer LC is mostly transmitted through the liquid crystal layer LC (transparent state). In a state where voltage is applied to the liquid crystal layer LC, the alignment direction of the liquid crystal molecule 32 changes, and the optical axis of the polymer 31 and the optical axis of the liquid crystal molecule 32 cross each other. Therefore, light entering the liquid crystal layer LC is scattered inside the liquid crystal layer LC (scattering state).

The display panel PNL comprises a display portion DA which displays an image, and a frame-shaped non-display portion NDA which surrounds the display portion DA. The sealant SE is located in the non-display portion NDA. The display portion DA comprises a plurality of pixels PX arranged in a matrix in the first direction X and the second direction Y.

As shown enlarged in FIG. 1, each pixel PX comprises a switching element SW, a pixel electrode PE, a common electrode CE, the liquid crystal layer LC and the like. The switching element SW is composed of, for example, a thin-film transistor (TFT), and is electrically connected to a scanning line G and a signal line S. The scanning line G is electrically connected to the switching element SW in each of the pixels PX arranged in the first direction X. The signal line S is electrically connected to the switching element SW in each of the pixels PX arranged in the second direction Y. The pixel electrode PE is electrically connected to the switching element SW. The common electrode CE is disposed common to the pixel electrodes PE. Each pixel electrode PE is opposed to the common electrode CE in the third direction Z. The liquid crystal layer LC (in particular, the liquid crystal molecules 32) is driven by an electric field produced between the pixel electrode PE and the common electrode CE. A capacitance CS is formed, for example, between an electrode of the same potential as the common electrode CE and an electrode of the same potential as the pixel electrode PE.

As will be described later, the first substrate SUB1 comprises the scanning line G, the signal line S, the switching element SW and the pixel electrode PE, and the second substrate SUB2 comprises the common electrode CE. In the first substrate SUB1, the scanning line G and the signal line S are electrically connected to the wiring board 1 or the IC chip 2.

The first substrate SUB1 comprises a first transparent substrate 10, and the second substrate SUB2 comprises a second transparent substrate 20. The first transparent substrate 10 has side surfaces 10C and 10D along the first direction X and side surfaces 10E and 10F along the second direction Y. The second transparent substrate 20 has side surfaces 20C and 20D along the first direction X and side surfaces 20E and 20F along the second direction Y. In the configuration example shown in FIG. 1, the side surfaces 10D and 20D, the side surfaces 10E and 20E and the side surfaces 10F and 20F overlap each other in planar view. However, they may not overlap each other. The side surface 20C is located between the side surface 10C and the display portion DA in planar view. The first substrate SUB1 has an extension portion Ex between the side surface 10C and the side surface 20C. That is, the extension portion Ex corresponds to a part of the first substrate SUB1 which does not overlap the second substrate SUB2.

The wiring board 1 and the IC chip 2 are mounted on the extension portion Ex. The wiring board 1 is, for example, a foldable flexible printed circuit board. The IC chip 2 incorporates, for example, a display driver which outputs a signal required for image display, and the like. Note that the IC chip 2 may be mounted on the wiring board 1.

The light-emitting module 100 comprises a plurality of light-emitting elements LD and a wiring board F shown by a dotted line. The light-emitting elements LD each are electrically connected to the wiring board F. The light-emitting module 100 is disposed along a side surface (or a board side surface) of the display panel PNL. Note that the light-emitting module 100 may be disposed along a short side of the display panel PNL or a long side of the display panel PNL.

In the configuration example shown in FIG. 1, the light-emitting elements LD overlap the extension portion Ex in planar view. The light-emitting elements LD are arranged spaced apart from one another along the first direction X. The light-emitting elements LD each are, for example, a light-emitting diode. The light-emitting elements LD are disposed along the side surface (first side surface) 20C of the second transparent substrate 20 and emit light toward the side surface 20C. Note that the light-emitting module 100 may be disposed along another side surface, for example, the side surface (second side surface) 20D on a side opposite to the side surface 20C or the other side surface 20E or 20F. When the light-emitting module 100 is disposed along the side surface 20D, 20E or 20F, the light-emitting module 100 may emit light toward a side surface of either of the first transparent substrate 10 and the second transparent substrate 20 or side surfaces of both of the first transparent substrate 10 and the second substrate 20, or a side surface of another substrate (for example, a third transparent substrate which will be described later). Note that, when the light-emitting module 100 is disposed along the side surface 20E or 20F, the polymer 31 of the liquid crystal layer LC is formed in a stripe shape extending along the second direction Y, and the liquid crystal molecules 32 are aligned such that major axes of them extend along the second direction Y.

The liquid crystal layer LC has at least two regions along the traveling direction of light emitted from the light-emitting module 100, and the regions correspond to regions which are different from each other in the initial alignment state of at least one of the polymer 31 and the liquid crystal molecules 32. In the configuration example shown in FIG. 1, the liquid crystal layer LC has three regions arranged in the second direction Y. That is, the liquid crystal layer LC has a first region LCA on a side close to the side surface 20C (or a side close to the light-emitting module 100), a second region LCB on a side close to the side surface 20D (or between the side surface 20D and the first region LCA), and a third region LCC between the first region LCA and the second region LCB. The first region LCA, the third region LCC and the second region LCB are arranged in this order along the second direction Y. The initial alignment state of each of the first region LCA, the third region LCC and the second region LCB will be described later.

When the length along the second direction Y of the second transparent substrate 20 (or the distance along the second direction Y from the side surface 20C to the side surface 20D) is referred to as L, in one example, the length along the second direction Y of each of the first region LCA, the third region LCC and the second region LCB is L/3. However, it is not limited to this example. For example, the length of the first region LCA may be L/6 or L/2.

Figure 2:
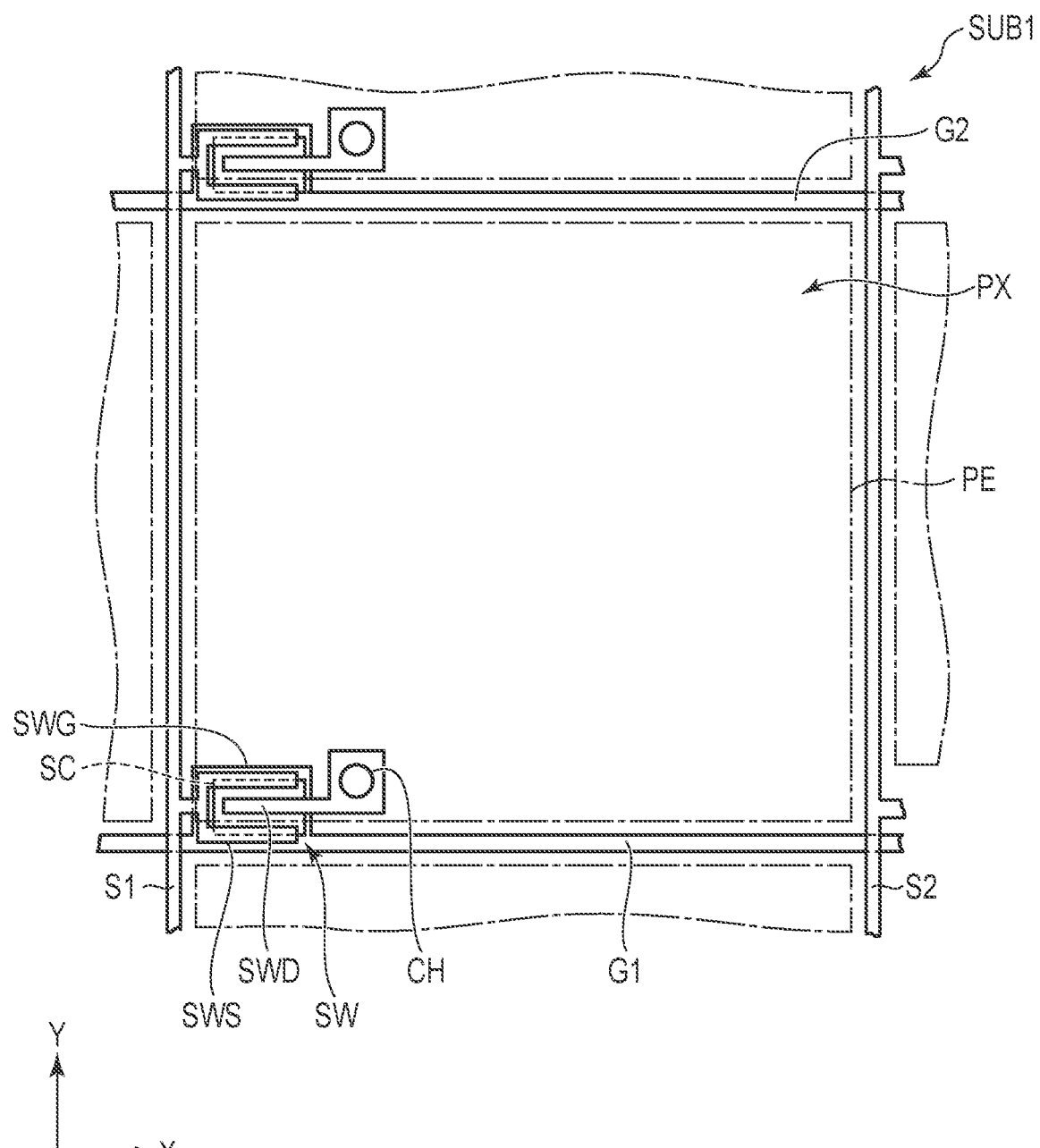
FIG. 2 is a plan view showing an example of a pixel PX shown in FIG. 1.

FIG. 2 is a plan view showing an example of the pixel PX shown in FIG. 1. The first substrate SUB1 comprises scanning lines G1 and G2, signal lines S1 and S2, the switching element SW, and the pixel electrode PE shown by a dashed-dotted line.

The scanning lines G1 and G2 are arranged spaced apart from each other in the second direction Y. The signal lines S1 and S2 cross the scanning lines G1 and G2 and are arranged spaced apart from each other in the first direction X. Here, the extension direction of the scanning lines G1 and G2 is the first direction X, and the extension direction of the signal lines S1 and S2 is the second direction Y. The pixel PX shown in FIG. 2 corresponds to a region defined by the scanning lines G1 and G2 adjacent to each other and the signal lines S1 and S2 adjacent to each other.

The switching element SW is disposed at the intersection of the scanning line G1 and the signal line S1. The switching element SW comprises a semiconductor layer SC. The semiconductor layer SC overlaps a gate electrode SWG integrally formed with the scanning line G1. A source electrode SWS integrally formed with the signal line S1 and a drain electrode SWD each are electrically connected to the semiconductor layer SC. The pixel electrode PE is disposed between the scanning lines G1 and G2 and between the signal lines S1 and S2. The pixel electrode PE overlaps the drain electrode SWD, and is electrically connected to the switching element SW via a contact hole CH.

Figure 3:
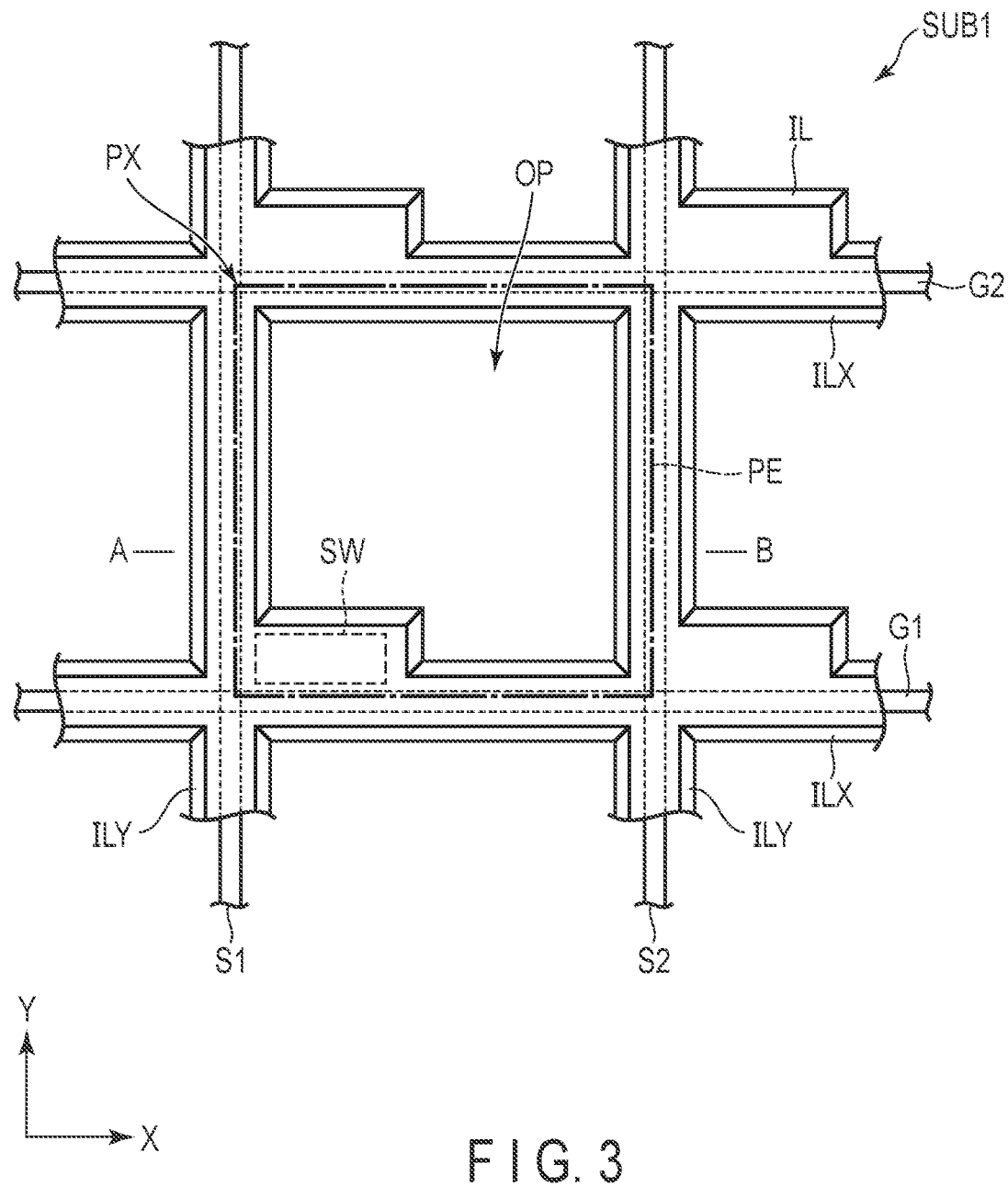
FIG. 3 is a plan view showing an example of an insulating film IL disposed in a first substrate SUB1 shown in FIG. 2.

FIG. 3 is a plan view showing an example of an insulating film IL disposed in the first substrate SUB1 shown in FIG. 2. The insulating film IL is formed in a lattice shape defining an opening OP in each pixel PX. That is, the insulating film IL has portions ILX extending along the first direction X, and portions ILY extending along the second direction Y. The insulating film IL overlaps the scanning lines G1 and G2, the signal lines S1 and S2 and the switching element SW. The pixel electrode PE shown by a dashed-dotted line is disposed overlapping the opening OP. The peripheral portion of the pixel electrode PE overlaps the portions ILX and the portions ILY. The insulating film IL is, for example, an organic insulating film but may be an inorganic insulating film.

FIG. 4 is a cross-sectional view showing an example of the display panel PNL along line A-B shown in FIG. 3.

The first substrate SUB1 comprises the first transparent substrate 10, insulating films 11 and 12, the signal lines S1 and S2, the insulating film IL, a capacitance electrode C, the pixel electrode PE and a first alignment film AL1. The insulating film 11 is disposed on the upper surface of the first transparent substrate 10. The signal lines S1 and S2 are disposed on the insulating film 11, and are covered with the portions ILY of the insulating film IL. The capacitance electrode C is disposed on the insulating film 11 in the opening OP, and is covered with the insulating film 12. In addition, the capacitance electrode C is disposed on the portions ILY, and is opposed to the signal lines S1 and S2 across the portions ILY. The pixel electrode PE is disposed on the insulating film 12 in the opening OP, and is covered with the first alignment film AL1. The pixel electrode PE is opposed to the capacitance electrode C across the insulating film 12, and forms the capacitance CS of the pixel PX. Note that the capacitance electrode C may have an opening overlapping a part of the pixel electrode PE. The contact hole CH shown in FIG. 2 penetrates the insulating film 12. The first alignment film AL1 is in contact with the liquid crystal layer LC.

The second substrate SUB2 comprises the second transparent substrate 20, the common electrode CE and a second alignment film AL2. The common electrode CE is disposed on a side of the second transparent substrate 20 which is opposed to the first substrate SUB1, and is covered with the second alignment film AL2. Note that, in the second substrate SUB2, a light-shielding layer may be disposed immediately above the switching element SW, the scanning lines G and the signal lines S. In addition, a transparent insulating film may be disposed between the second transparent substrate 20 and the common electrode CE or between the common electrode CE and the second alignment film AL2. The common electrode CE is opposed to the pixel electrodes PE across the liquid crystal layer LC. In addition, the common electrode CE is electrically connected to the capacitance electrode C, and has the same potential as the capacitance electrode C. The second alignment film AL2 is in contact with the liquid crystal layer LC.

The liquid crystal layer LC is disposed between the first substrate SUB1 and the second substrate SUB2.

The first transparent substrate 10 and the second transparent substrate 20 each are an insulating substrate such as a glass substrate or a plastic substrate. The insulating film 11 is, for example, a transparent inorganic insulating film such as silicon oxide, silicon nitride or silicon oxynitride. The insulating film IL is, for example, a transparent organic insulating film such as acrylic resin. The insulating film 12 is a transparent inorganic insulating film such as silicon nitride. The capacitance electrode C, the pixel electrode PE and the common electrode CE each are a transparent electrode formed of a transparent conductive material such as indium tin oxide (ITO) or indium zinc oxide (IZO). The first alignment film AL1 and the second alignment film AL2 each are, for example, a horizontal alignment film having an alignment restriction force along the XY-plane. In one example, the first alignment film AL1 and the second alignment film AL2 are subjected to alignment treatment along the first direction X. Note that the alignment treatment may be rubbing treatment or photo-alignment treatment.

Figure 5:
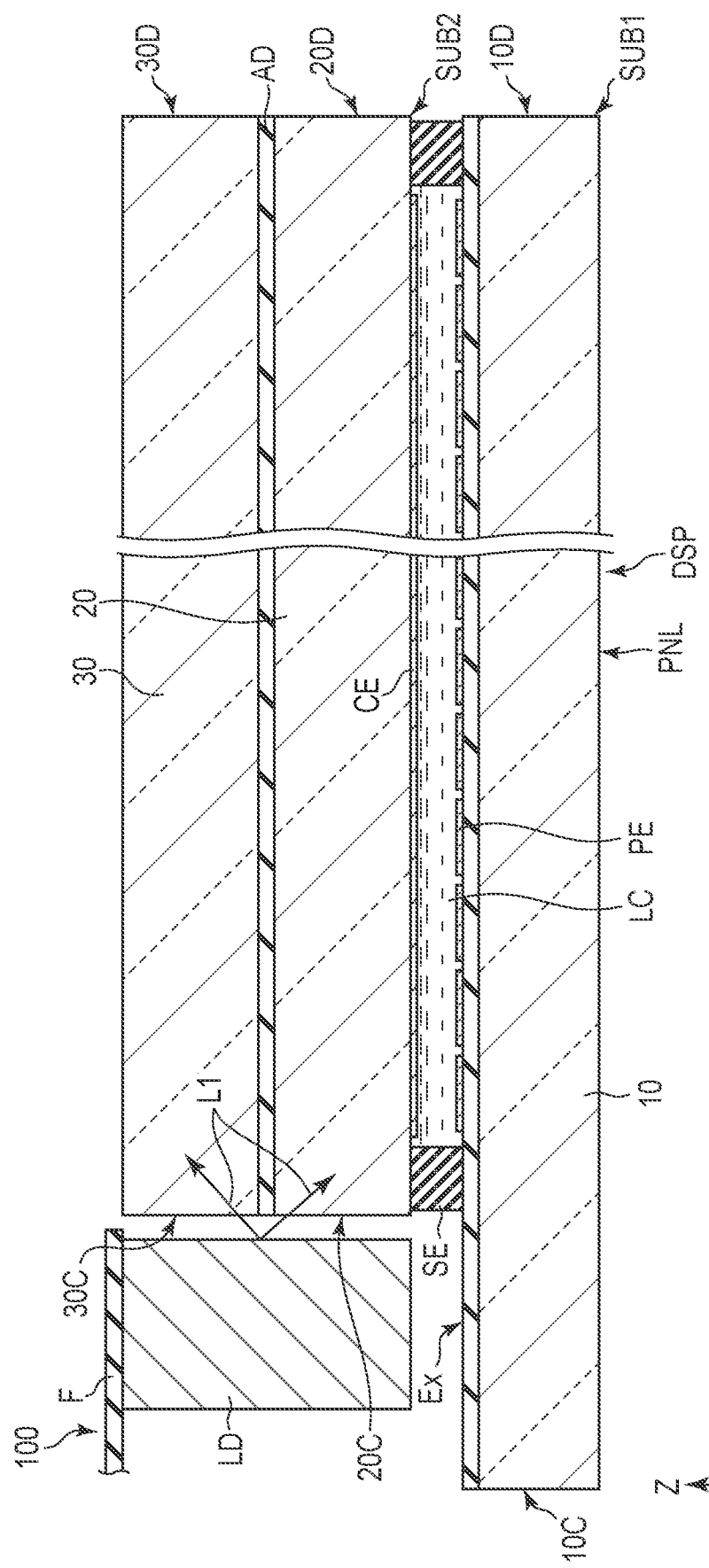
FIG. 5 is a cross-sectional view showing a configuration example of the display device DSP of the present embodiment.

FIG. 5 is a cross-sectional view showing a configuration example of the display device DSP of the present embodiment. Regarding the display panel PNL, only the main part of it is shown in the drawing.

The display device DSP further comprises a third transparent substrate 30. The third transparent substrate 30 is bonded to the second transparent substrate 20 by a transparent adhesive layer AD. The second transparent substrate 20 is located between the liquid crystal layer LC and the third transparent substrate 30 in the third direction Z. Note that the third transparent substrate 30 may be omitted.

The third transparent substrate 30 is an insulating substrate such as a glass substrate or a plastic substrate. The third transparent substrate 30 has an equal refractive index to the first transparent substrate 10 and the second transparent substrate 20. The adhesive layer AD has an equal refractive index to each of the second transparent substrate 20 and the third transparent substrate 30. Being "equal" here is not limited to when the refractive index difference is zero but also includes when the refractive index difference is less than or equal to 0.03. A transparent layer having a refractive index less than the refractive index of the third transparent substrate 30 may be disposed between the second transparent substrate 20 and the third transparent substrate 30.

The third transparent substrate 30 has side surfaces 30C and 30D. In the configuration example shown in FIG. 5, the side surface 30C is located directly above the side surface 20C. However, the side surface 20C and the side surface 30C may be disposed shifted from each other in the second direction Y. In addition, the side surface 20D is located directly above the side surface 10D, and the side surface 30D is located directly above the side surface 20D. However, the side surface 10D, the side surface 20D and the side surface 30D may be disposed shifted from one another in the second direction Y.

The light-emitting module 100 is disposed along the side surface 20C. In the light-emitting module 100, the light-emitting elements LD are disposed between the first substrate SUB1 and the wiring board F in the third direction Z. The light-emitting elements LD are opposed to the side surface 20C and the side surface 30C in the second direction Y. Note that a transparent light guide may be disposed between the light-emitting elements LD and the side surfaces 20C and 30C.

Next, light L1 emitted from the light-emitting elements LD will be described with reference to FIG. 5.

The light-emitting elements LD emit light L1 toward the side surfaces 20C and 30C. The light L1 emitted from the light-emitting elements LD travels along the direction of an arrow indicating the second direction Y, and enters the second transparent substrate 20 from the side surface 20C and enters the third transparent substrate 30 from the side surface 30C. The light L1 entering the second transparent substrate 20 and the third transparent substrate 30 travels inside the display panel PNL while repeatedly reflected. The light L1 entering the liquid crystal layer LC to which no voltage is applied is mostly transmitted through the liquid crystal layer LC. In addition, the light L1 entering the liquid crystal layer LC to which voltage is applied is scattered in the liquid crystal layer LC.

The display device DSP can be observed from a side on which the first transparent substrate 10 is located, and can also be observed from a side on which the third transparent substrate 30 is located. In addition, regardless of whether the display device DSP is observed from the first transparent substrate 10 side or the third transparent substrate 30 side, the background of the display device DSP can be observed through the display device DSP.

FIG. 6 is a cross-sectional view showing another configuration example of the display device DSP of the present embodiment. The configuration example shown in FIG. 6 is different from the configuration example shown in FIG. 5 in that the third transparent substrate 30 is omitted. The light-emitting elements LD are opposed to the side surface 20C in the second direction Y, and emit the light L1 toward the side surface 20C. The light L1 emitted from the light-emitting elements LD enters the second transparent substrate 20 from the side surface 20C, and travels inside the display panel PNL while repeatedly reflected.

FIG. 7 is a cross-sectional view showing another configuration example of the display device DSP of the present embodiment. The configuration example shown in FIG. 7 is different from the configuration example shown in FIG. 5 in that the light-emitting module 100 is disposed on the second transparent substrate 20. The light-emitting module 100 is disposed along the side surface 20C, but the light-emitting elements LD are not opposed to the side surface 20C. The light-emitting elements LD are disposed in a region overlapping the sealant SE in the third direction Z. The light-emitting elements LD are opposed to the side surface 30C in the second direction Y, and emit the light L1 toward the side surface 30C. The light L1 emitted from the light-emitting elements LD enters the third transparent substrate 30 from the side surface 30C, and travels inside the display panel PNL while repeatedly reflected.

Incidentally, even when the transparent state where no voltage is applied is formed over the entire region of the liquid crystal layer LC, the optical axis of the polymer 31 and the optical axis of the liquid crystal molecule 32 do not necessarily become perfectly parallel to each other. Here, the optical axis of the polymer 31 is assumed to correspond to the extension axis of the polymer, and the optical axis of the liquid crystal molecule 32 is assumed to correspond to the director of the liquid crystal molecule 32. The mismatch of the optical axis of the polymer 31 and the optical axis of the liquid crystal molecule 32 may become one of the causes of minute scattering of light.

The light L1 emitted from the light-emitting elements LD attenuates as the distance from the side surfaces 20C and 30C, that is, an incidence portion increases. That is, a scattering luminance in a region close to the light-emitting module 100 tends to be greater as compared with a scattering luminance in a region far from the light-emitting module 100. Therefore, even when the transparent state is formed over the entire region of the liquid crystal layer LC, minute scattering may be noticeable in the region close to the light-emitting module 100.

Figure 8:
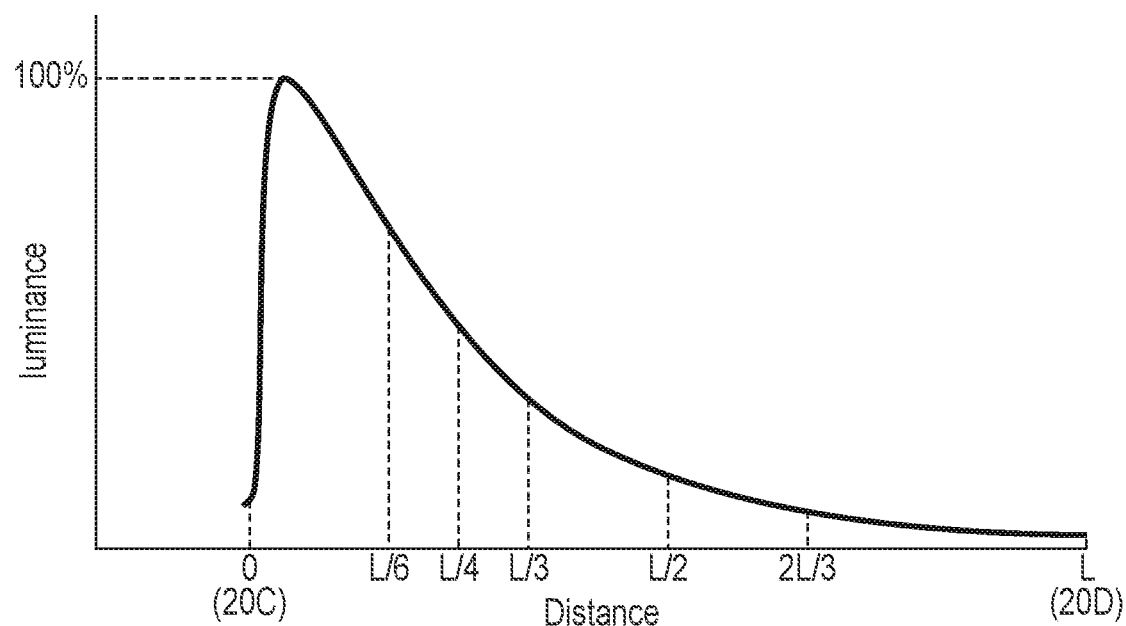
FIG. 8 is an illustration for explaining the tendency of luminance in a comparative example.

FIG. 8 is an illustration for explaining the tendency of luminance in a comparative example. The horizontal axis represents the distance along the second direction Y from the side surface 20C, and the vertical axis represents the luminance. The display device DSP of the comparative example is assumed to be a display device in which the extension axes of the polymer 31 are substantially uniform and the directors (initial alignment directions) of the liquid crystal molecules 32 are substantially uniform over the entire region of the liquid crystal layer LC. In this display device DSP, it is confirmed that the luminance when the light-emitting elements LD of the light-emitting module 100 are turned on tends to peak at a position close to the side surface 20C and decrease toward the side surface 20D.

When the distance from the side surface 20C to the side surface 20D is referred to as L, a luminance of about ⅔ of the peak luminance is obtained at a position of L/6 of the distance from the side surface 20C. In addition, a luminance of about 50% of the peak luminance is obtained at a position of L/4 of the distance from the side surface 20C. A luminance of about 30% of the peak luminance is obtained at a position of L/3 of the distance from the side surface 20C. A luminance of about ⅙ of the peak luminance is obtained at a position of L/2 of the distance from the side surface 20C.

There has been demand for improvement of the non-uniformity of the luminance in the plane of the display device DSP in the transparent state, that is, in the state where the background of the display device DSP can be visually recognized.

The difference of initial alignment state among the first region LCA, the second region LCB and the third region LCC will be described with reference to a cross-sectional view of the liquid crystal layer LC in the display device DSP of the present embodiment. FIGS. 9A, 9B, 9C, 10A, 10B and 10C each are a cross-sectional view in an XZ-plane defined by the first direction X and the third direction Z, and each show the initial alignment state of the polymer 31 and the liquid crystal molecules 32 in a state where no voltage is applied to the liquid crystal layer LC. In addition, regarding the first substrate SUB1 and the second substrate SUB2, only the main parts of them are shown in the drawing.

The stripe-shaped polymer 31 is formed by polymerizing a monomer aligned by the alignment restriction force of the first alignment film AL and the second alignment film AL2, and is not necessarily linearly formed. In the specification, the average extension direction of the polymer 31 (the optical axis with consideration of the refractive index distribution of the polymer 31) is defined as an extension axis AX.

In addition, the liquid crystal molecules 32 are aligned by the alignment restriction force of the first alignment film AL1 and the second alignment film AL2, but are not necessarily uniformly aligned in the liquid crystal layer LC. In the specification, the average alignment direction of the major axis of the liquid crystal molecule 32 (or the average optical axis with consideration of the refractive index distribution of the liquid crystal molecule 32) is defined as a director DX.

First Embodiment

Figure 9A:
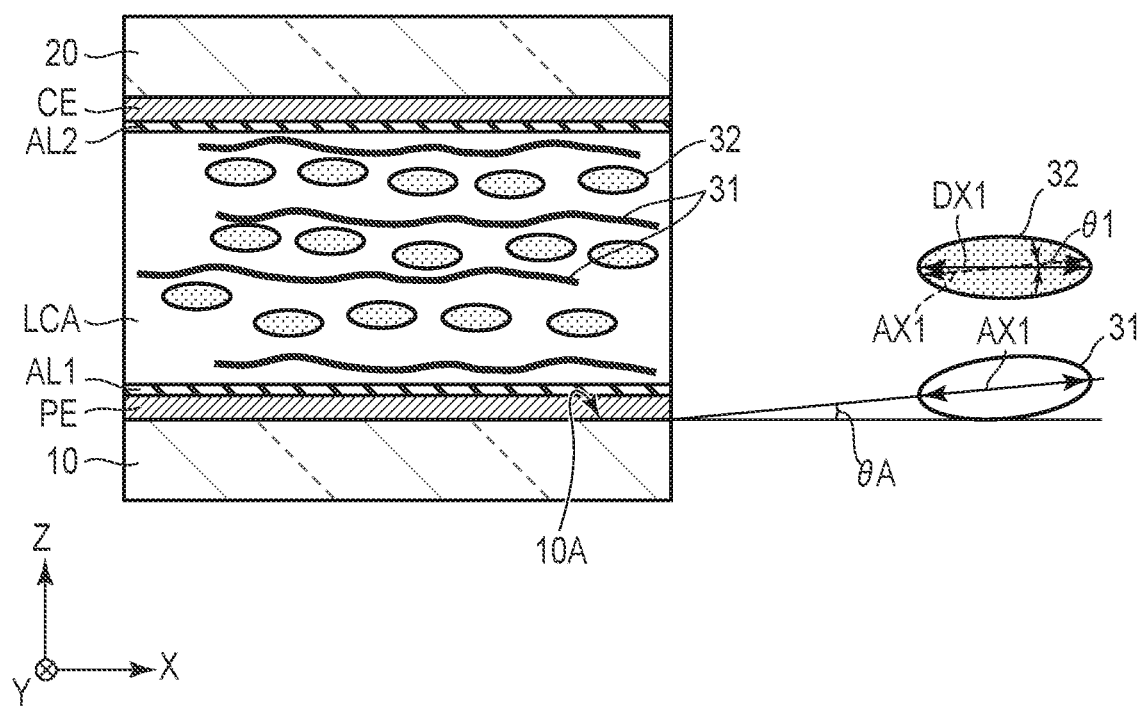
FIG. 9A is a cross-sectional view showing a polymer 31 and liquid crystal molecules 32 in a first region LCA shown in FIG. 1.

FIG. 9A is a cross-sectional view showing the polymer 31 and the liquid crystal molecules 32 in the first region LCA shown in FIG. 1.

In the first region LCA, the polymer 31 has a first extension axis AX1, and the liquid crystal molecule 32 has a first director DX1. The angle between the first extension axis AX1 and the main surface (or the inner surface) 10A of the first transparent substrate 10 is referred to as a first inclination angle θA. The first inclination angle θA is an angle greater than or equal to 0°.

The angle between the first extension axis AX1 and the first director DX1 is referred to as a first intersection angle θ1. The first intersection angle θ1 is an angle greater than or equal to 0°.

Figure 9B:
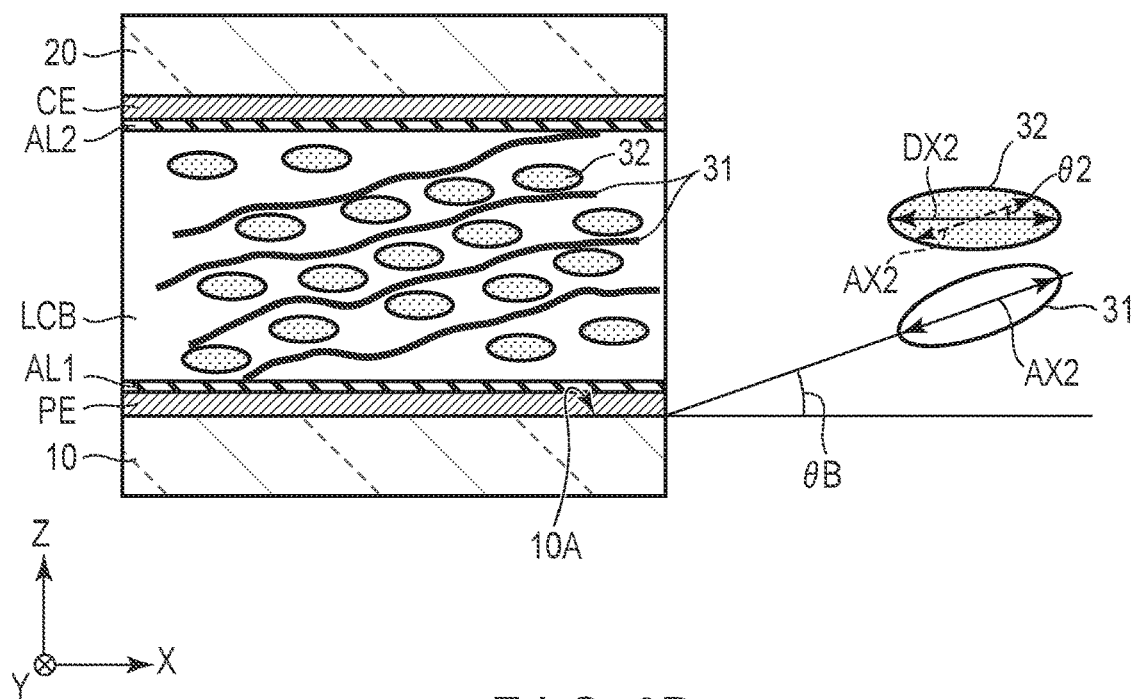
FIG. 9B is a cross-sectional view showing the polymer 31 and the liquid crystal molecules 32 in a second region LCB shown in FIG. 1.

FIG. 9B is a cross-sectional view showing the polymer 31 and the liquid crystal molecules 32 in the second region LCB shown in FIG. 1.

In the second region LCB, the polymer 31 has a second extension axis AX2, and the liquid crystal molecule 32 has a second director DX2. The angle between the second extension axis AX2 and the main surface 10A of the first transparent substrate 10 is referred to as a second inclination angle θB. The second inclination angle θB is different from the first inclination angle θA, and is an angle less than or equal to 90°. That is, the second extension axis AX2 is non-parallel to the first extension axis AX1 in the XZ-section. Alternatively, the polymer 31 of the second region LCB extends in a different direction from the polymer 31 of the first region LCA in the XZ-section. For example, the first inclination angle θA is less than the second inclination angle θB.

The angle between the second extension axis AX2 and the second director DX2 is referred to as a second intersection angle θ2. The second intersection angle θ2 is different from the first intersection angle θ1, and is an angle less than or equal to 90°. For example, the first intersection angle θ1 is less than the second intersection angle θ2.

The second director DX2 is substantially parallel to the first director DX1. That is, the liquid crystal molecule 32 of the second region LCB is aligned substantially parallel to the liquid crystal molecule 32 of the first region LCA in the XZ-section.

Figure 9C:
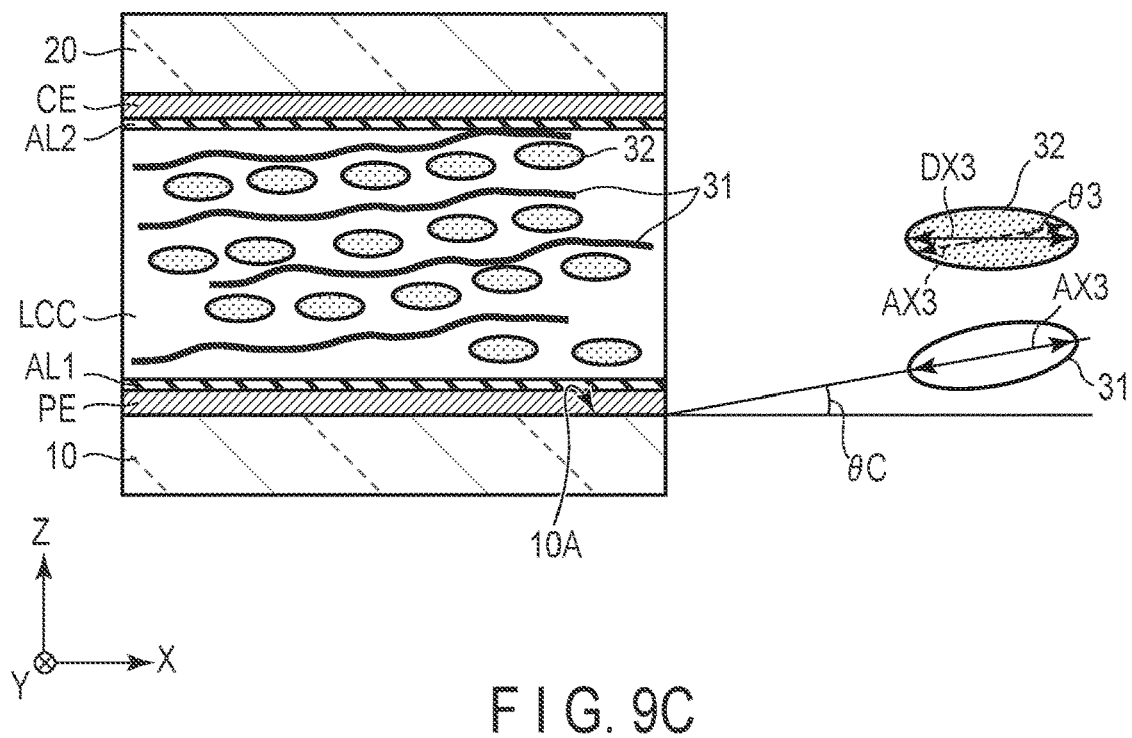
FIG. 9C is a cross-sectional view showing the polymer 31 and the liquid crystal molecules 32 in a third region LCC shown in FIG. 1.

FIG. 9C is a cross-sectional view showing the polymer 31 and the liquid crystal molecules 32 in the third region LCC shown in FIG. 1.

In the third region LCC, the polymer 31 has a third extension axis AX3, and the liquid crystal molecule 32 has a third director DX3. The angle between the third extension axis AX3 and the main surface 10A of the first transparent substrate 10 is referred to as a third inclination angle θC. The third inclination angle θC is a different angle from the first inclination angle θA and the second inclination angle θB. That is, the third extension axis AX3 is non-parallel to the first extension axis AX1 and the second extension axis AX2 in the XZ-section. For example, the third inclination angle θC is greater than the first inclination angle θA but less than the second inclination angle θB.

The angle between the third extension axis AX3 and the third director DX3 is referred to as a third intersection angle θ3. The third intersection angle θ3 is a different angle from the first intersection angle θ1 and the second intersection angle θ2. For example, the third intersection angle θ3 is greater than the first intersection angle θ1 but less than the second intersection angle θ2.

The third director DX3 is substantially parallel to the second director DX2.

The extension axis AX of the polymer 31 of the liquid crystal layer LC may continuously change from a side close to the first side surface 20C to a side close to the second side surface 20D. That is, the inclination angle of the extension axis AX with respect to the first transparent substrate 10 may change in such a way as to gradually increase from the side close to the first side surface 20C to the side close to the second side surface 20D.

The difference of the inclination angle described above can be realized by adjusting the pretilt angle of the first alignment film AL1 and the second alignment film AL2, the voltage applied to the liquid crystal layer LC while the monomer is polymerized, or the like.

For example, the alignment restriction force (force to align along the XY-plane) of the first alignment film AL1 and the second alignment film AL2 which are in contact with the first region LCA is greater than the alignment restriction force of the first alignment film AL1 and the second alignment film AL2 which are in contact with the second region LCB.

Alternatively, the first alignment film AL1 and the second alignment film AL2 which are in contact with the first region LCA are subjected to alignment treatment such that the pretilt angle becomes less than that of the first alignment film AL1 and the second alignment film AL2 which are in contact with the second region LCB.

Alternatively, the voltage applied to the liquid crystal layer LC while the polymer 31 of the first region LCA is formed is less than the voltage applied to the liquid crystal layer LC while the polymer 31 of the second region LCB is formed.

In the first embodiment described above, in the initial alignment state where no voltage is applied to the liquid crystal layer LC, the directors DX of the liquid crystal molecules 32 of the first region LCA, the second region CLB and the third region LCC are substantially parallel to one another. On the other hand, the extension axes AX of the polymer 31 of the first region LCA, the second region LCB and the third region LCC are inclined at different inclination angles with respect to the first transparent substrate 10. Therefore, the intersection angle between the director DX and the extension axis AX varies among the first region LCA, the second region LCB and the third region LCC.

The intersection angle in the first region LCA close to the first side surface 20C or the light-emitting module 100 is less than the intersection angle in the second region LCB close to the second side surface 20D. Therefore, when the light-emitting elements LD of the light-emitting module 100 are turned on, minute scattering in the first region LCA is suppressed, but minute scattering in the second region LCB tends to be induced. On the other hand, as described above, the scattering luminance in the region close to the light-emitting module 100 tends to be greater as compared with the scattering luminance in the region far from the light-emitting module 100. That is, the minute scattering in a region in which the scattering luminance tends to be high is suppressed, and the minute scattering in a region in which the scattering luminance tends to be low is induced. Therefore, the uniformity of the luminance in the plane of the display device DSP can be improved.

Second Embodiment

Figure 10A:
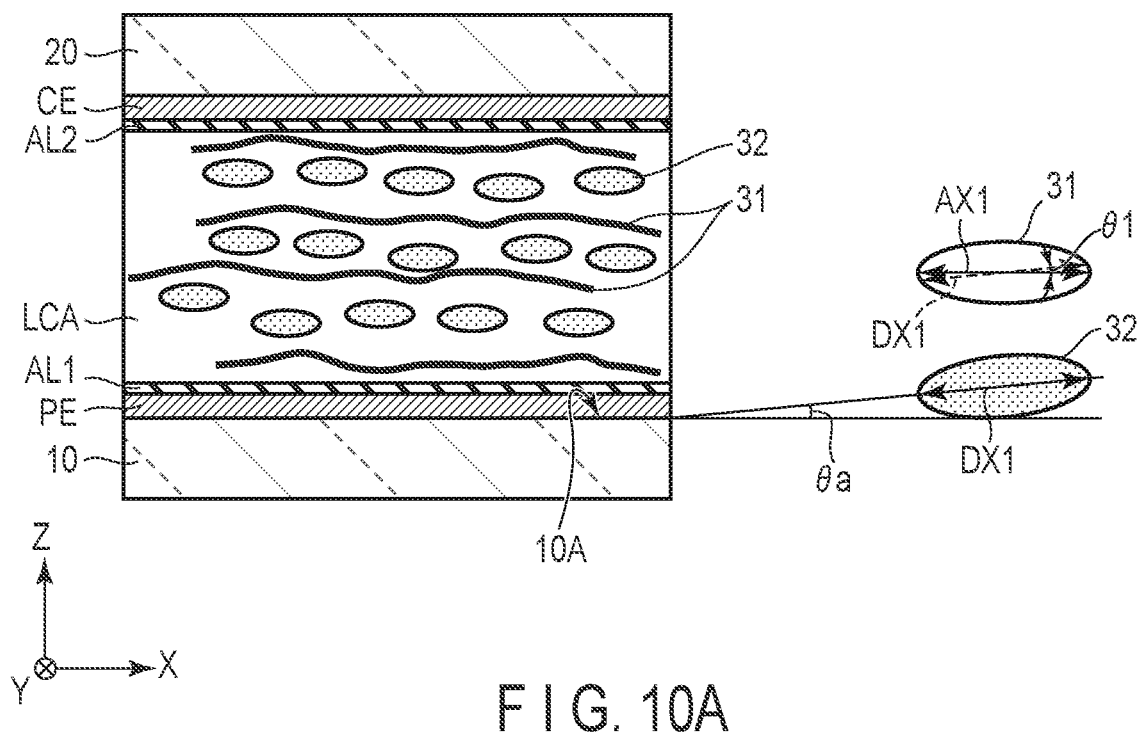
FIG. 10A is a cross-sectional view showing the polymer 31 and the liquid crystal molecules 32 in the first region LCA shown in FIG. 1.

FIG. 10A is a cross-sectional view showing the polymer 31 and the liquid crystal molecules 32 in the first region LCA shown in FIG. 1.

In the first region LCA, the polymer 31 has the first extension axis AX1, and the liquid crystal molecule 32 has the first director DX1. The angle between the first director DX1 and the main surface 10A of the first transparent substrate 10 is referred to as a first inclination angle θa. The first inclination angle θa is an angle of greater than or equal to 0°.

The angle between the first extension axis AX1 and the first director DX1 is referred to as the first intersection angle θ1. The first intersection angle θ1 is an angle greater than or equal to 0°.

Figure 10B:
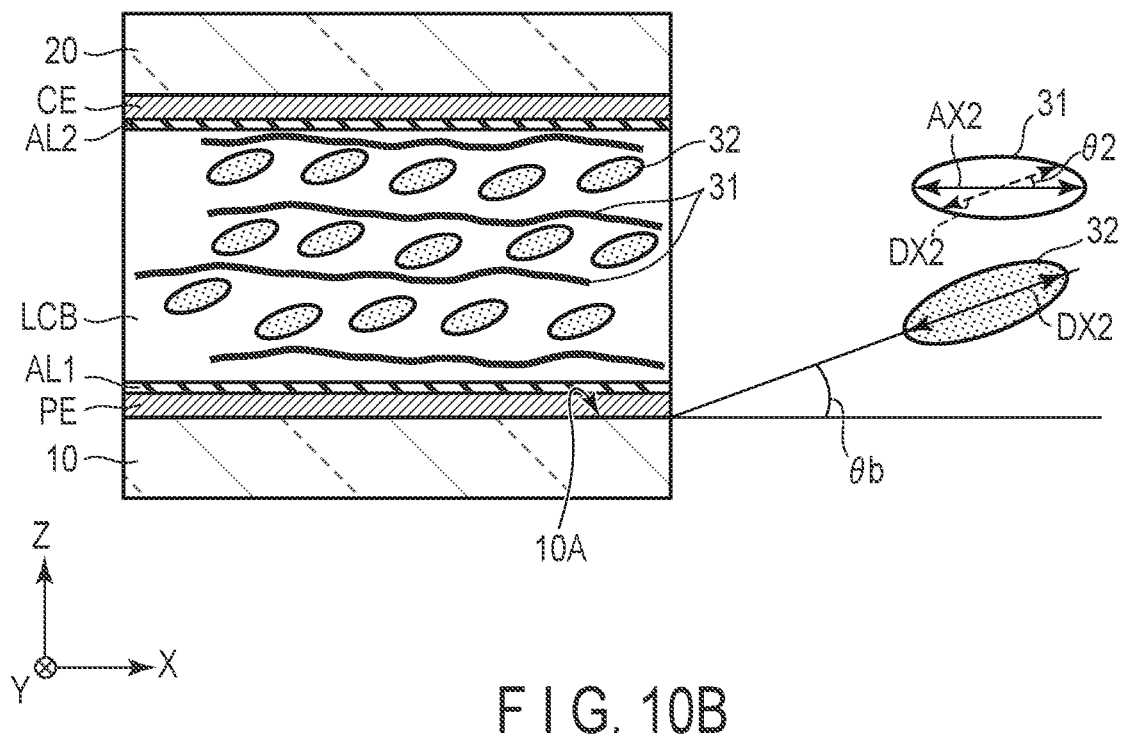
FIG. 10B is a cross-sectional view showing the polymer 31 and the liquid crystal molecules 32 in the second region LCB shown in FIG. 1.

FIG. 10B is a cross-sectional view showing the polymer 31 and the liquid crystal molecules 32 in the second region LCB shown in FIG. 1.

In the second region LCB, the polymer 31 has the second extension axis AX2, and the liquid crystal molecule 32 has the second director DX2. The angle between the second director DX2 and the main surface 10A of the first transparent substrate 10 is referred to as a second inclination angle θb. The second inclination angle θb is different from the first inclination angle θa, and is an angle less than or equal to 90°. That is, the second director DX2 is non-parallel to the first director DX1 in the XZ-section. Alternatively, the alignment direction of the liquid crystal molecule 32 of the second region LCB is different from the alignment direction of the liquid crystal molecule 32 of the first region LCA in the XZ-section. For example, the first inclination angle θa is less than the second inclination angle θb.

The angle between the second extension axis AX2 and the second director DX2 is referred to as the second intersection angle θ2. The second intersection angle θ2 is different from the first intersection angle θ1, and is an angle less than or equal to 90°. For example, the first intersection angle θ1 is less than the second intersection angle θ2.

The second extension axis AX2 is substantially parallel to the first extension axis AX1. That is, the extension direction of the polymer 31 of the second region LCB is substantially parallel to the extension direction of the polymer 31 of the first region LCA in the XZ-section.

FIG. 10C is a cross-sectional view showing the polymer 31 and the liquid crystal molecules 32 in the third region LCC shown in FIG. 1.

In the third region LCC, the polymer 31 has the third extension axis AX3, and the liquid crystal molecule 32 has the third director DX3. The angle between the third director DX3 and the main surface 10A of the first transparent substrate 10 is referred to as a third inclination angle θc. The third inclination angle θc is a different angle from the first inclination angle θa and the second inclination angle θb. That is, the third director DX3 is non-parallel to the first director DX1 and the second director DX2 in the XZ-section. For example, the third inclination angle θc is greater than the first inclination angle θa but less than the second inclination θb.

The angle between the third extension axis AX3 and the third director DX3 is referred to as the third intersection angle θ3. The third intersection angle θ3 is a different angle from the first intersection angle θ1 and the second intersection angle θ2. For example, the third intersection angle θ3 is greater than the first intersection angle θ1 but less than the second intersection angle θ2.

The third extension axis AX3 is substantially parallel to the second extension axis AX2.

The director DX of the liquid crystal molecule 32 of the liquid crystal layer LC may continuously change from the side close to the first side surface 20C to the side close to the second side surface 20D. That is, the inclination angle of the director DX with respect to the first transparent substrate 10 may change in such a way as to gradually increase from the side close to the first side surface 20C to the side close to the second side surface 20D.

In the second embodiment described above, in the initial alignment state where no voltage is applied to the liquid crystal layer LC, the extension axes AX of the polymer 31 of the first region LCA, the second region LCB and the third region LCC are substantially parallel to one another. On the other hand, the directors DX of the liquid crystal molecules 32 of the first region LCA, the second region LCB and the third region LCC are inclined at different inclination angles with respect to the first transparent substrate 10. Therefore, the intersection angle between the director DX and the extension axis AX varies among the first region LCA, the second region LCB and the third region LCC.

Also in the second embodiment, effects similar to those which are obtained in the first embodiment can be obtained.

As described above, according to the present embodiment, a display device capable of improving the uniformity of luminance can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
 a first substrate comprising a first transparent substrate, and a pixel electrode disposed in each of a plurality of pixels on the first transparent substrate;
 a second substrate comprising a second transparent substrate having a first side surface and a second side surface opposite to the first side surface, and a common electrode disposed over the pixels;
 a liquid crystal layer disposed between the first substrate and the second substrate, and including a stripe-shaped polymer and liquid crystal molecules; and
 a light-emitting module disposed along the first side surface,
 wherein
 the liquid crystal layer has a first region which is closer to the first side surface than to the second side surface, and a second region which is closer to the second side surface than to the first side surface and is located between the second side surface and the first region,
 when no voltage is applied to the liquid crystal layer, a first intersection angle of a first director of a first liquid crystal molecule and a first extension axis of the polymer included in the first region is different from a second intersection angle of a second director of a second liquid crystal molecule and a second extension axis of the polymer included in the second region, and
 the first intersection angle is less than the second intersection angle.

2. The display device of claim 1, wherein a first inclination angle of the first extension axis with respect to the first transparent substrate is different from a second inclination angle of the second extension axis with respect to the first transparent substrate.

3. The display device of claim 2, wherein
 the first inclination angle is less than the second inclination angle.

4. The display device of claim 3, wherein the first director is substantially parallel to the second director.

5. The display device of claim 3, wherein
 the liquid crystal layer has a third region between the first region and the second region, and
 a third inclination angle of a third extension axis of the polymer included in the third region with respect to the first transparent substrate is greater than the first inclination angle and is less than the second inclination angle.

6. The display device of claim 1, wherein a first inclination angle of the first director with respect to the first transparent substrate is different from a second inclination angle of the second director with respect to the first transparent substrate.

7. The display device of claim 6, wherein
 the first inclination angle is less than the second inclination angle.

8. The display device of claim 7, wherein the first extension axis is substantially parallel to the second extension axis.

9. The display device of claim 7, wherein
 the liquid crystal layer has a third region between the first region and the second region, and
 a third inclination angle of a third director of the liquid crystal molecule included in the third region with respect to the first transparent substrate is greater than the first inclination angle and is less than the second inclination angle.

10. A display device comprising:
a first substrate comprising a first transparent substrate, a pixel electrode disposed in each of a plurality of pixels on the first transparent substrate, and a first alignment film covering the pixel electrode;
a second substrate comprising a second transparent substrate having a first side surface and a second side surface opposite to the first side surface, a common electrode disposed over the pixels, and a second alignment film covering the common electrode;
a liquid crystal layer disposed between the first substrate and the second substrate, and including a stripe-shaped polymer and liquid crystal molecules; and
a light-emitting module disposed along the first side surface,
wherein
the liquid crystal layer has a first region which is closer to the first side surface than to the second side surface, and a second region which is closer to the second side surface than to the first side surface and is located between the second side surface and the first region,
when no voltage is applied to the liquid crystal layer, a first inclination angle of a first extension axis of a first polymer included in the first region with respect to the first transparent substrate is different from a second inclination angle of a second extension axis of a second polymer included in the second region with respect to the first transparent substrate, and
the first inclination angle is less than the second inclination angle.

11. The display device of claim 10, wherein a first director of the liquid crystal molecule included in the first region is substantially parallel to a second director of the liquid crystal molecule included in the second region.

12. A display device comprising:
a first substrate comprising a first transparent substrate, a pixel electrode disposed in each of a plurality of pixels on the first transparent substrate, and a first alignment film covering the pixel electrode;
a second substrate comprising a second transparent substrate having a first side surface and a second side surface opposite to the first side surface, a common electrode disposed over the pixels, and a second alignment film covering the common electrode;
a liquid crystal layer disposed between the first substrate and the second substrate, and including a stripe-shaped polymer and liquid crystal molecules; and
a light-emitting module disposed along the first side surface,
wherein
the liquid crystal layer has a first region which is closer to the first side surface than to the second side surface, and a second region which is closer to the second side surface than to the first side surface and is located between the second side surface and the first region,
when no voltage is applied to the liquid crystal layer, a first inclination angle of a first director of a first liquid crystal molecule included in the first region with respect to the first transparent substrate is different from a second inclination angle of a second director of a second liquid crystal molecule included in the second region with respect to the first transparent substrate, and
the first inclination angle is less than the second inclination angle.

13. The display device of claim 12, wherein a first extension axis of the polymer included in the first region is substantially parallel to a second extension axis of the polymer included in the second region.

* * * * *